(12) United States Patent
Mizuno et al.

(10) Patent No.: US 7,009,357 B2
(45) Date of Patent: Mar. 7, 2006

(54) SERVO CONTROL SYSTEM AND ITS CONTROL METHOD

(75) Inventors: Kimihiro Mizuno, Tokyo (JP); Nobuyasu Takaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/381,457

(22) PCT Filed: Aug. 2, 2001

(86) PCT No.: PCT/JP01/06643

§ 371 (c)(1),
(2), (4) Date: Feb. 11, 2004

(87) PCT Pub. No.: WO03/017019

PCT Pub. Date: Feb. 27, 2003

(65) Prior Publication Data
US 2005/0264252 A1 Dec. 1, 2005

(51) Int. Cl.
G05B 15/00 (2006.01)

(52) U.S. Cl. ............ 318/575; 318/568.11; 318/568.15; 318/573; 318/574; 700/83; 700/189

(58) Field of Classification Search ................ 318/575, 318/573, 574, 568.11, 568.15; 700/83, 189
See application file for complete search history.

(56) References Cited

U.S. PATENT DOCUMENTS

| | | | | |
|---|---|---|---|---|
| 4,823,279 A | * | 4/1989 | Perzley et al. | 700/251 |
| 5,895,181 A | * | 4/1999 | Ito et al. | 409/132 |
| 6,571,138 B1 | * | 5/2003 | Okada et al. | 700/83 |
| 6,697,683 B1 | * | 2/2004 | Tisue | 700/56 |
| 2004/0153175 A1 | * | 8/2004 | Tisue | 700/56 |

FOREIGN PATENT DOCUMENTS

| | | |
|---|---|---|
| JP | 5-73147 A | 3/1993 |
| JP | 8-76822 A | 3/1996 |
| JP | 9-198113 A | 7/1997 |
| JP | 9-269811 A | 10/1997 |
| JP | 11-334163 A | 12/1999 |

OTHER PUBLICATIONS

International Search Report for PCT/JP01/00643 dated Oct. 9, 2001.

* cited by examiner

*Primary Examiner*—Paul Ip
(74) *Attorney, Agent, or Firm*—Sughrue Mion, PLLC

(57) ABSTRACT

After a controller #1 has started giving an interpolating instruction, the length on an interpolation line is calculated by a first calculation means in synchronism with a clock signal from a clock synchronous circuit 45, and after having executed a first step for generating a synthetic locus-use frame 100 based upon the calculated value, the synthetic locus-use frame 100 is transmitted to controller #2 so that, after controller #2 has executed a second step for receiving a synthetic locus calculation-use frame from a receiving means, controllers #1, #2 execute a third step for calculating the position on the interpolation line based upon the synthetic locus-use frame 100 by using a second calculation means.

6 Claims, 9 Drawing Sheets

SERVO CONTROL SYSTEM AND ITS CONTROL METHOD

This application is a continuation of a 371 of PCT/JP01/06643 filed on Aug. 2, 2001.

TECHNICAL FIELD

The present invention relates to a servo control system having a plurality of servo-controllers, and more specifically relates to interpolation controlling of respective axes of servo-motors.

BACKGROUND ART

Referring to FIG. 8, a conventional servo control system which is disclosed in Japanese Laid-Open Patent Publication No. 9-269811, will be explained.

In FIG. 8, the servo control system is constituted by a host CPU 6 which outputs controlling instructions to the entire system as an upper controlling unit, a plurality of servo-CPUs 8, 9 which executes the same calculations as the host CPU 6 and serve as lower controlling unit, drivers D1 to D3 which are connected to the servo-CPU 8 and also connected to servo motors M1 to M3 of an orthogonal-type robot (Cartesian type robot) 15, and drivers D4, D5 which are connected to the servo-CPU 9 and also connected to servo motors M4, M5 of a joint-type robot 17.

To the host CPU 6 are connected a key board 10 through which positional data for positioning points, for example, are inputted, an instruction device 11 for giving instructions about positional data as to positioning target points, and an external input-output circuit 13 that allows transmitting and receiving operations to or from an external device.

The following description will discuss an operation of the servo-control system having the above-mentioned arrangement shown in FIG. 8.

Upon starting an interpolation controlling process, the host CPU 6 transmits operating instructions for the next target point etc., to the servo-CPUs 8 and 9, and then the servo-CPUs 8, 9 execute the same calculations respectively for the synchronous control. Based on the result of the above calculations, the servo-CPUs 8, 9 execute the position feed-back controlling calculations of the respective servo-motors M1 to M3, M4, M5 to transmit positioning completion instructions to the host CPU 6.

In the above-mentioned servo control system, the respective servo-CPUs 8, 9 to which operating instructions are transmitted from the host CPU 6 can execute the same calculations respectively to carry out the synchronous control among the robots 15 and 17. Therefore, the above-mentioned system provides an effective control system for synchronous control when the number of controlled axes is comparatively small.

However, in a servo control system in which a number of motors are synchronously controlled among the respective servo-CPUs 8, 9 for interpolation controls, for example, in a servo control system for driving a tire molding machine with a number of control axes, as will be described later, the calculation time required in the respective servo-CPUs 8, 9 increases as the number of motors to be synchronously controlled increases, when each servo CPUs 8 and 9 need to execute the same calculations. This results in a longer interpolation controlling time.

In order to solve this problem, utilization of those servo-CPUs 8, 9 with a higher processing speed is recommendable, however, there is an inevitable limitation to the processing speed. Here, in the case when respective motors are mutually subjected to an interpolation controlling process, with respect to multiple axes M1–M5 as shown in FIG. 8, these are simply shown by two axes form, that is, X-axis and Y-axis as shown in FIG. 9.

In FIG. 9, the interpolation controlling calculations consist of synthetic locus calculations for calculating a length Lt1 on an interpolation line and respective-axis calculations for calculating positions Xt1 and Yt1 of the respective axes based on the length Lt1 on the interpolation line. Since the synthetic locus calculations are expected to be common to the respective motors, there is no need for the respective servo-CPUs 8, 9 to execute the same synthetic locus calculations, respectively.

Therefore, it is possible that either one of the servo CPU 8 (9) executes the synthetic locus calculations, and the other respective servo CPUs 8, 9 execute respective-axis calculations using the resultant value of the synthetic locus calculations.

However, the respective servo CPUs 8, 9 can not execute the respective axis calculations while one of the servo CPU 8 (9) is executing the synthetic locus calculations, therefore, the total interpolation-control processing time which is the sum of the synthetic locus calculation time and respective axis calculation time is not substantially reduced.

The present invention has been made to solve the above-mentioned problem in the servo-control system which carries out an interpolation control of respective axes of motors, and the object of the invention is to provide a servo control system and a control method thereof which can decrease the interpolation-control processing time of this entire system among two or more controllers without using CPU with a higher processing speed.

DISCLOSURE OF INVENTION

A servo control system according to a first invention is provided with: a first controller which carries out an interpolation-controlling process by calculating the length on a first interpolation line based on respective first axes of the first and second motors, and a second controller which carries out an interpolation-controlling process by calculating the length on a second interpolation line based on respective second axes of the third and fourth motors, wherein the first controller includes a first storing means for storing information used for calculating the length on the first interpolation line, wherein the second controller includes a second storing means for storing information used for calculating the length on the second interpolation line, wherein the first and second controllers include a third storing means for storing information used for calculating the positions of the first and second respective axes based on the lengths on the first and second interpolation lines, a first calculating means which, after initiation of the interpolation instruction, reads out information stored in the first and second storing means to calculate the lengths on the first and second interpolation lines, and which produces a first frame based on the resultant calculated values, a first transmitting means for transmitting the first frame to the other of the controllers, a receiving means for receiving the first frame, and a second calculating means which reads out information stored in the second storing means to calculate the positions of the respective first and second axes based on the lengths on the first and second interpolation lines.

According to such a servo control system, the first and second controllers allow the first calculating means to calculate the lengths on the first and second interpolation lines, and the first frame, formed based on the calculated value, is transmitted from the first controller to the second controller as well from the second controller to the first controller by the first transmitting means, and after the first and second controllers have received the lengths on the interpolation lines through the receiving means, the positions of the respective first and second axes are calculated by the second calculation means based on the lengths on the first and second interpolation lines.

Therefore, since after the first and second controllers have simultaneously calculated the lengths on the first and second interpolation lines by the first calculation means, the positions of the respective first and second axes are calculated by the second calculation means, it is possible to shorten the interpolation controlling time in comparison with a servo control system in which, after the first controller has calculated the length on the first interpolation line, the second controller successively calculates the length on the second interpolation line to calculate the positions of the respective first and second axes.

Here, the interpolation controlling time refers to the sum of a time for calculating the length on the interpolation line and a time for calculating the positions of the respective axes.

A servo control system according to the second invention is characterized in that the first and second controllers in the first invention further include: the fourth storing means for storing an interpolation instruction, a respective-axes instruction generating means which reads out the interpolation instruction from the fourth storing means based on initiation of the interpolation instruction to generate instruction values for the respective first and second axes and a second frame based on the instruction values, the second transmitting means for transmitting the second frame to the other controller, and the second receiving means for receiving the second frame.

According to the servo control system, the respective-axes instruction generating means generates the respective-axes instructions for calculating the positions of the respective axes, and the second frame is transmitted to the other controller so that the first and second controllers are allowed to receive the respective-axes instructions.

Therefore, since the positions of the respective axes are calculated by the respective axes instruction generating means for each of the interpolation instructions, it becomes possible to construct a servo-control system by using only the controllers without receiving the respective-axes instructions from upper controllers.

A servo control system according to the third invention is characterized in that the servo control system according to the first invention further include an upper controller for transmitting an interpolation instruction to the first and second controllers, wherein the upper controller is provided with a respective-axes instruction generating means which generates first and second respective-axes instructions based on the interpolation instruction, and transmits the first and second respective-axes instructions to the first and second controllers, and the first and second controllers have the third receiving means for receiving the first and second respective-axes instructions.

According to the third invention, the upper controller allows the respective-axes instruction generating means to generate the respective-axes instructions used for calculating the positions of the respective first and second axes, and transmits these to the first and second controllers so that the second controller receives the respective-axes instructions.

Therefore, since the first and second controllers need not to generate the first and second respective-axes instructions, it is possible to reduce the operation load on the first and second controllers, and the operation load on the upper controller is also mitigated since it only needs to generate the respective-axes instructions.

According to the fourth invention, a control method for the servo control system comprising a first controller which carries out an interpolation controlling process by calculating the length on the first interpolation line based on the respective first axis of the first and second motors, and a second controller which carries out an interpolation controlling process by calculating the length on the second interpolation line based on the respective second axes of the third and fourth motors, includes: a first step, after the first and second controllers have started the interpolation instructions, calculating the lengths on the first and second interpolation lines by using the first calculation means, to generate a first frame based on the calculated value, a second step of transmitting the first frame from either of the first and second controllers to the other controller by the transmission means, so that the first frame is received by the other controller through the transmission means, and a third step of calculating the positions of the respective first and second axes based on the first frame by using the second calculation means in the first and second controllers.

According to the control method for the servo control system, since the first and second controllers simultaneously calculate the lengths on the first and second interpolation lines by using the first calculation means, and calculate the respective first and second axes positions based on the calculated lengths on the first and second interpolation lines, it is possible to shorten interpolation controlling time in comparison with the conventional system in which the first and second controllers calculate sequentially the length on the first interpolation line and the length on the second interpolation line.

The control method of the servo control system according to the fifth invention is characterized in that the first to third steps according to the third invention are executed after the first and second controllers allowed the respective-axes instruction generating means to generate the instruction values of the respective first and second axes based on the start of the interpolation instruction, and after having transmitted the second frame formed based upon the instruction values of the respective axes to the other controller.

According to the control method, a servo control system can be built only by controllers, without receiving respective axial instructions from an upper controller, since the respective axial instruction generating means calculates the respective axial position for every interpolation instruction.

The control method of the servo control system according to the sixth invention is characterized in that the first to third steps according to the fourth invention are executed after an upper controller generated the instructions for the respective first and second axes based on the start of the interpolation instruction, and after having transmitted the instruction for the respective first and second axes to the first and second controllers.

According to the control method of the servo control system, there is no need for the first and the second controllers to generate the respective axes instructions. Therefore, the calculations load of the first and second controllers is mitigated and the calculations load of the upper controller is also effectively reduced, since it only generates respective axes instructions.

A servo control system according to the seventh invention is characterized in that the first frame according to the first or second invention includes a reaching instruction that is generated when a predetermined range of the previous positioning instruction position has been reached based on the calculated values of the respective first and second axes.

According to the servo control system, the next positioning instruction can be effectively generated in accordance with the reaching instruction based on the calculated values of the respective first and second axes.

BRIEF DESCRIPTION OF THE DRAWINGS

FIG. 3 (*b*) is a block diagram of a frame for respective axes calculation;

BEST MODE FOR CARRYING OUT THE INVENTION

Embodiment 1

Figure 1:
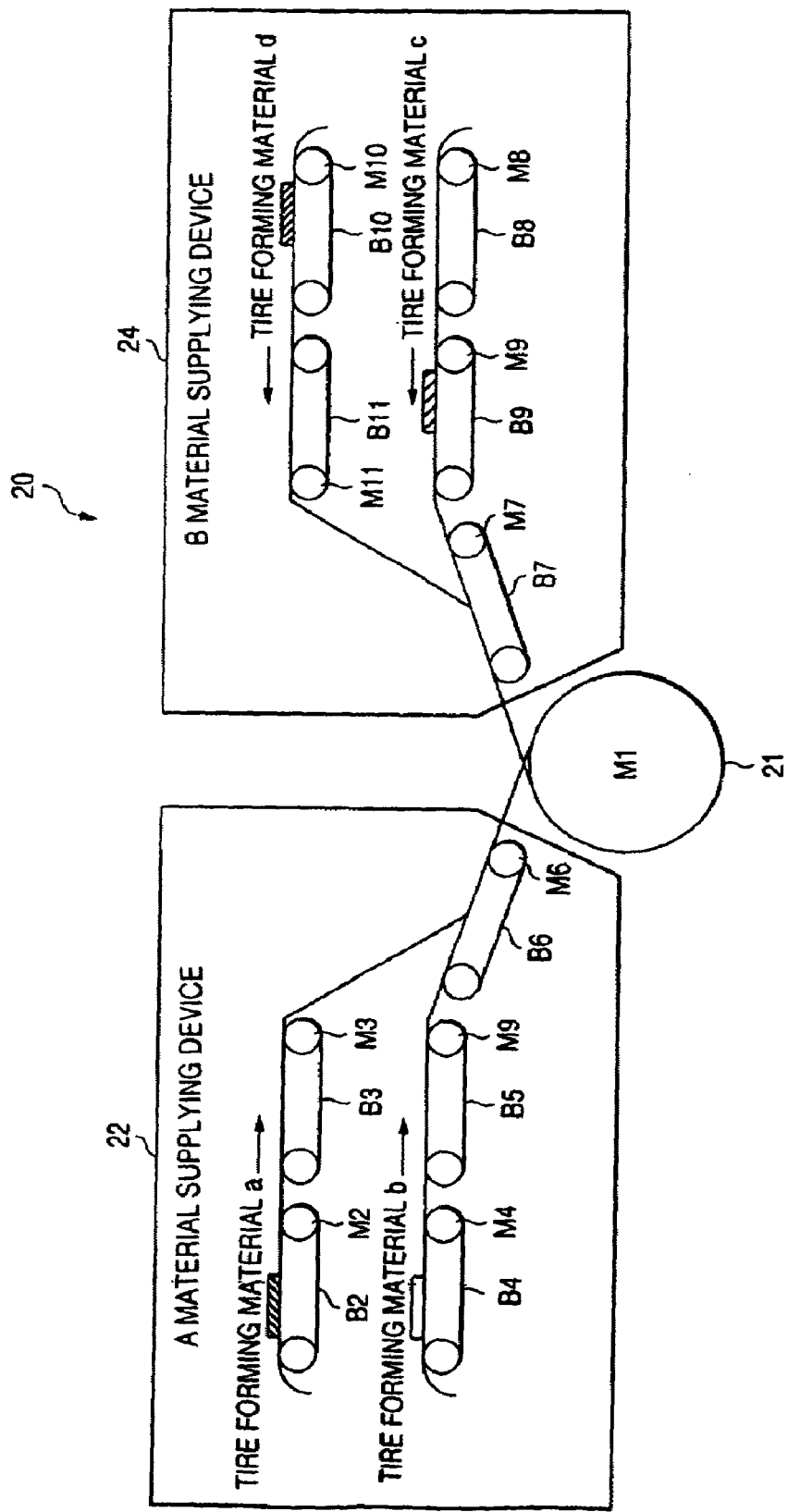
FIG. 1 is a schematic front view of the tire molding equipment which is driven and controlled by a servo control system in accordance with one embodiment of this invention.
Figure 2:
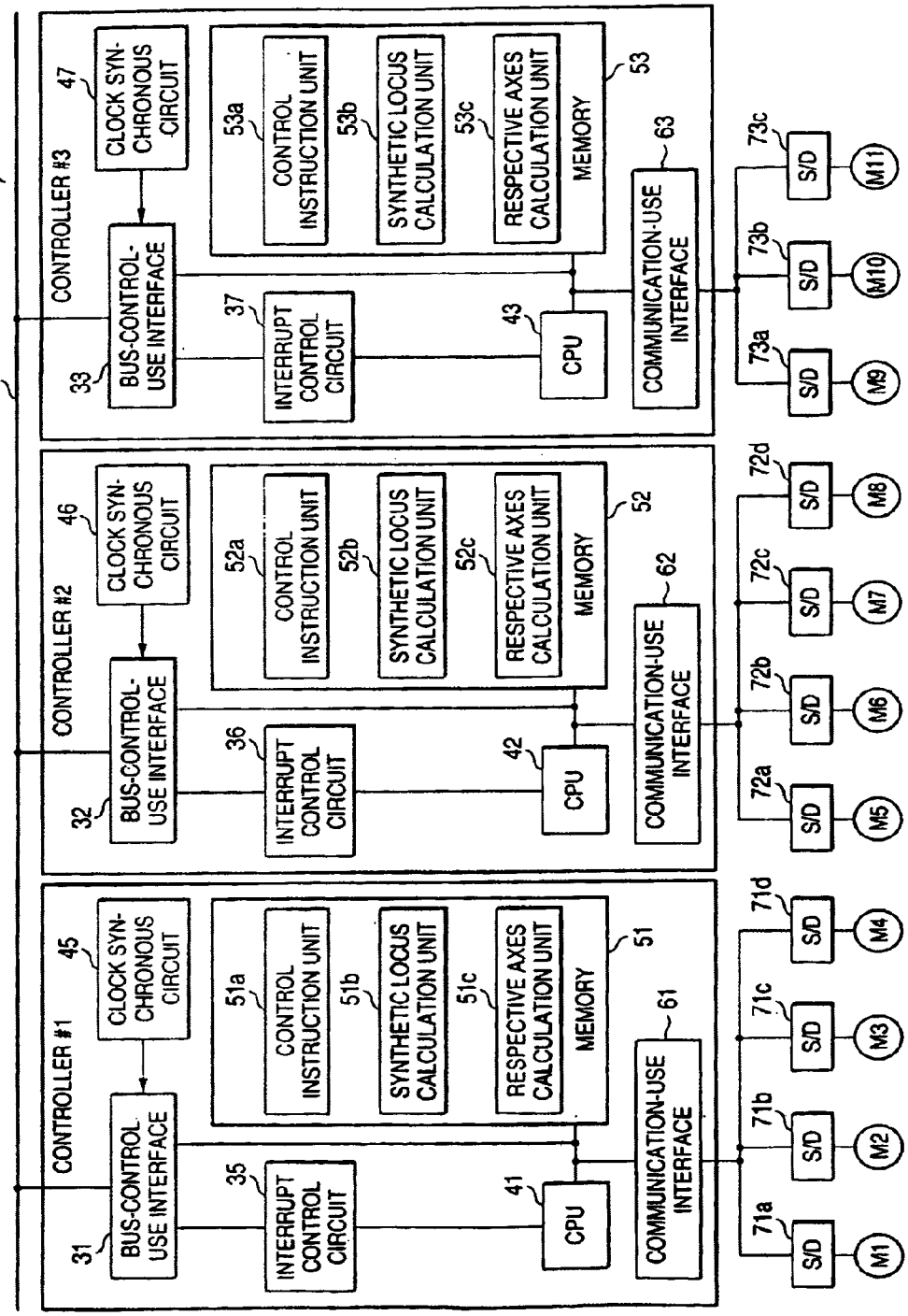
FIG. 2 is a block diagram of the entire servo control system showed in FIG. 1.
Figure 3A:
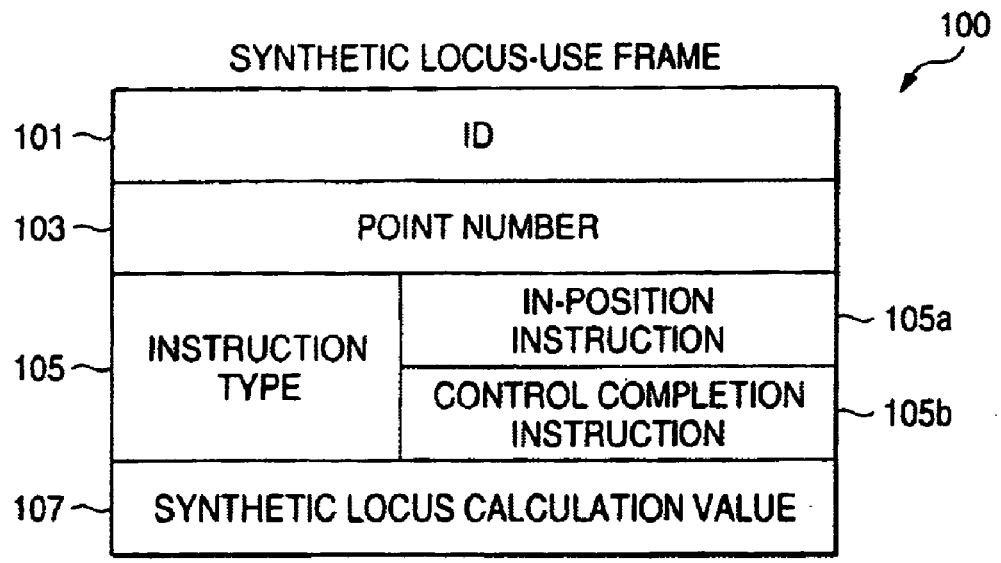
FIG. 3 (*a*) is a block diagram showing the synthetic locus calculation frame which is used in the system shown in FIG. 2.
Figure 3B:
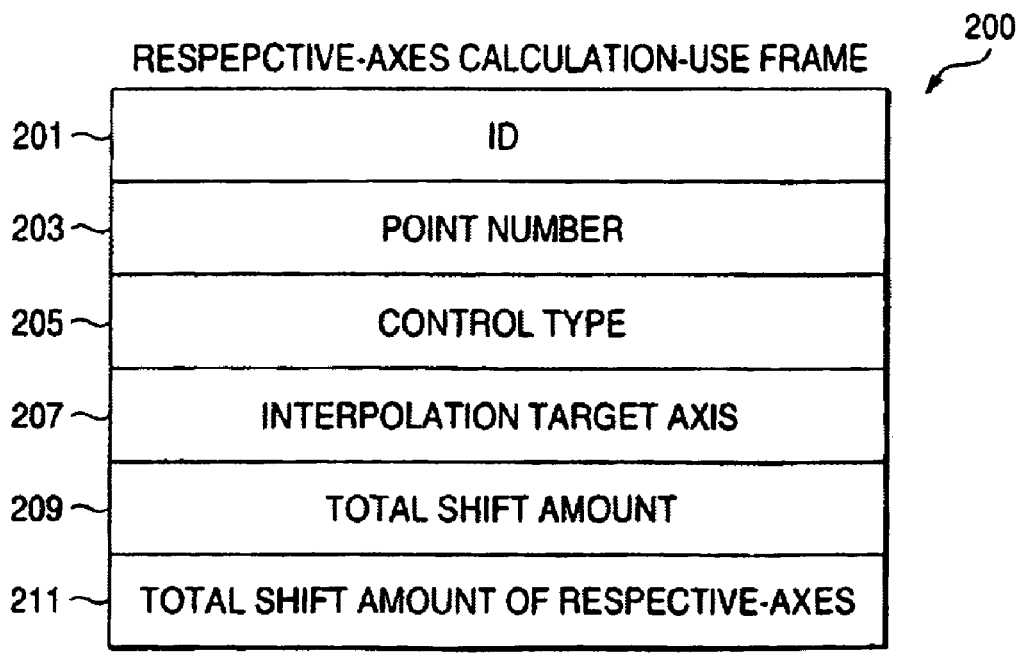
Figure 4:
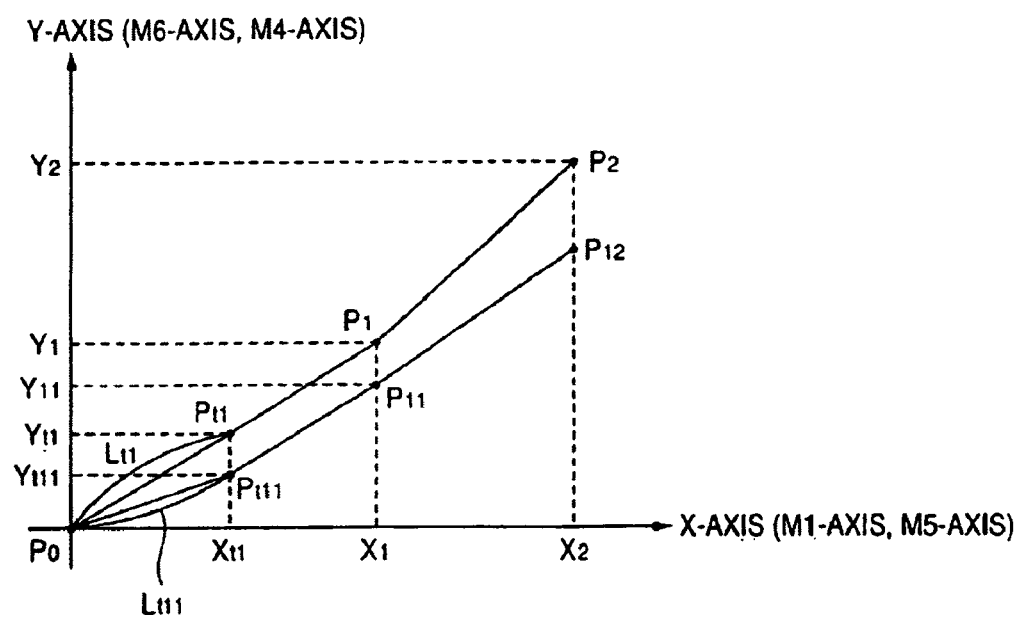
FIG. 4 is an explanatory curve showing an interpolation controlling process which is executed by the servo control system shown in FIG. 1, in which positioning points P0, P1, P2, P11, P12 are indicated on a plane defined by the X-Y axes.

Referring to FIGS. 1 to 4, a servo control system according to an embodiment of the present invention will be explained. FIG. 1 is a schematic front view of the tire molding equipment in which drive control is carried out by a servo control system according to this invention. FIG. 2 is a block diagram showing the entire servo-control system for driving the tire molding equipment showed in FIG. 1. FIG. 3(*a*) is a block diagram showing the synthetic locus calculation frame used for the system of FIG. 1. FIG. 3(*b*) is a block diagram of the respective-axes calculation frame. FIG. 4 is a curve that shows an interpolation controlling process executed by the servo control system of FIG. 1, which includes positioning points P0, P1, P2, P11, P12 on the X-Y axis plane.

In FIG. 1, a tire molding apparatus 20 for molding a tire using a servo control system is provided with a servo motor M1 for rotating a drum 21 which forms a tire and which is placed in the center; an A material supplying device 22 for supplying a tire forming material at the left-hand side of the drum 21 from a viewpoint facing to the drawing; and a B material supplying device 24 for supplying a tire forming material at the right-hand side of the drum 21. The A material supplying device 22 in the left-hand side comprises a first material supplying unit and a second material supplying unit. The first material supplying unit is provided with belt-conveyers B2, B3 by which the material a is supplied and which is driven by servo motors M2, M3, and a guiding belt-conveyer B6 which is located in the neighborhood of the dram 21 and having the servo motor M6. The second material supplying unit is provided with belt-conveyers B4, B5 by which the material b is supplied and which is driven by servo motors M4, M5. The B material supplying device 24 in the right-hand side comprises a third material supplying unit and a fourth material supplying unit. The third material supplying unit is provided with belt-conveyers B8, B9 by which the material c is supplied and which is driven by servo motors M8, M9, and a guiding belt-conveyer B7 which is located in the neighborhood of the dram 21 and having a servo motor M7. The fourth material supplying unit is provided with belt-conveyers B10, B11 by which the material d is supplied and which is driven by servo motors M10, M11.

In order to supply the tire materials a to d to the dram 21, the tire molding apparatus 20 is designed in such a manner that the servo motors M2 through M6 and M8 through M11 which constitutes the above-mentioned material supplying units, the servo motor M1 of the dram 21, and the servomotors M6 (M7) of the guiding belt-conveyers B6 (B7) are synchronously controlled properly each other (interpolation-controlled).

Here, in general, the tire molding apparatus 20 uses approximately 20 kind of materials, and about 100 axes in most cases, but FIG. 1 shows only a simplified structure. In FIG. 2, the servo control system 25 is provided with controllers #1 to #3 which is connected to a bus 30 and drive servo motors M1–M11. The controller #1 serving as the first controller is connected to servo motors M1 to M4 through the servo drivers 71*a* to 71*d*, the controller #2 serving as the second controller is connected to servo motors M5 to M8 through the servo drivers 72*a* to 72*d*, and the controller #3 is connected to servo motors M9 to M11 through the servo drivers 73*a* to 73*c*.

Thus, in order to carry out the synchronous control (interpolation control), the respective axes of the servo motors M2 to M5 and M8 to M11 which form the respective material supplying units, the servo motor M1 of the drum 21, and the servo motor M6 (M7) of guide-use belt-conveyor B6 (B7) are constituted so that predetermined controlling operation are carried out between controller #1 and controller #2 (#3). Respective controllers #1 to #3 are provided with bus-control-use I/Fs 31 to 33 that are connected to a bus 30, CPUs 41–43 which are connected to the I/F 31–33 through interrupt control circuits 35 to 37, clock synchronous circuits 45 to 47 which are connected to bus-control-use I/Fs 31 to 33 and serving as a clock generating means for generating clock signals with a constant cycle, memory 51 to 53 connected to CPUs 41–43, and communication-use I/F 61–63. The respective servo drivers 71*a* to 71*d*, 72*a* to 72*d*, and 73*a* to 73*d* are connected to the communication-use I/F 61 to 63. Memory 51 to 53 are respectively provided with synthetic locus calculation unit 51*b* serving as the first storing means, synthetic locus calculation units 52*b*, 53*b* serving as the second storing means, respective axes calculation units 51*c* to 53*c* serving as the third storing means, and control instruction units 51*a* to 53*a* serving as the fourth storing means.

In FIG. 4, the interpolation control on respective axes consists of the synthetic locus calculations for calculating the length Lt1 and Lt11 on the interpolation line, and the respective axes calculations for calculating positions Xt1, Yt1 on the first respective axes (on interpolation line) based on the length Lt1 on the interpolation line and for calculating positions Xt1 and Yt11 on the second respective axes (on interpolation line) based on the length Lt11 on the interpolation line. The control instruction unit 51a stores a starting position (current value) P0 serving as an interpolation instruction, target positions P1, P2, a maximum speed value, an acceleration time, and a deceleration time. The control instruction unit 52a stores a starting position (current value) P0 serving as an interpolation instruction, target positions P11, P12, a maximum speed value, an acceleration time, and a deceleration time.

Furthermore, the control instruction units 52a stores a starting position (current value) P0 serving as an interpolation instruction, target positions P21 and P22 (not shown) a maximum speed value, an acceleration time, and a deceleration time. The synthetic locus calculation unit 51b stores parameters such as a total shift distance, a speed, an acceleration time, and a deceleration time, so as to carry out the synthetic locus calculations used as information on the interpolation line between a starting position P0 and target positions P1, P2. The unit 51b also stores a predetermined interpolation calculation expression and a calculated synthetic locus calculation values. The synthetic locus calculation unit 52b (53b) stores parameters such as a total shift distance, a speed, an acceleration time, and a deceleration time, so as to carry out the synthetic locus calculations used as information on the interpolation line between a starting position P0 and target positions P11 (P12), P12 (P22), and the unit 52b (53b) also stores a predetermined interpolation calculation expression and a calculated synthetic locus calculations values. Each of the respective axes calculation units 51c to 53c stores information such as a current position, a total shift distance and a total shift amount of each axis. Moreover, each of the units 51c to 53c also stores a predetermined interpolation calculation expression and calculated respective axial calculation values.

FIG. 3(a) shows a format of the synthetic locus frame 100 serving as the first frame which is transmitted between controllers #1 to #3, for example, synthetic locus calculation value calculated by a controller #1 is transmitted to the other controllers #2 and #3. A synthetic locus frame 100 comprises ID101 which has the identification number for identifying controllers #1 to #3, point number 103 which shows the interpolation stage by defining points P0 to P1 as a number 1 and points P1 to P2 as a number 2, an instruction type 105 that shows a controlled state and consists of an in-position instruction 105a and a control completion instruction 105b, wherein the in-position instruction 105a serves as a reaching instruction that is generated by reaching a predetermined range in the previous positioning instruction position, for example, and a synthetic locus calculation value 107.

FIG. 3 (b) shows a format of the respective axes calculation frame 200 as the second frame transmitted between controllers #1 to #3. For example, the instructions for executing the respective-axes calculation stored in control instruction unit 51a of controller #1 are transmitted to other controllers #2 and #3. The respective-axes calculation frame 200 comprises controllers #1 to #3, point number 203 which is the same as the point number 103 mentioned above, a control type 205 which shows linear interpolation, circular interpolation, etc., an interpolation target axis 207 which specifies servo motors M1, M6, for example, as a target used for an interpolation operation, and a total shift amount 209 used as the distance between the positioning points of the respective axes and total shift amount 211 of each of the X and Y axes. The total shift amount 209 of controller #1 generates the distance between the first point P0 and the points P1 and P2 with respect to positioning points of the respective axes to specify servo-motors M1, M6 as the interpolation target axis 207.

On the other hand, the total shift amount 209 of controller #2 generates the distance between the first point P0 and the points P11 and P12 with respect to positioning points of the respective axes to specify servo motors M4, M5 as the interpolation target axis 207.

Figure 5:
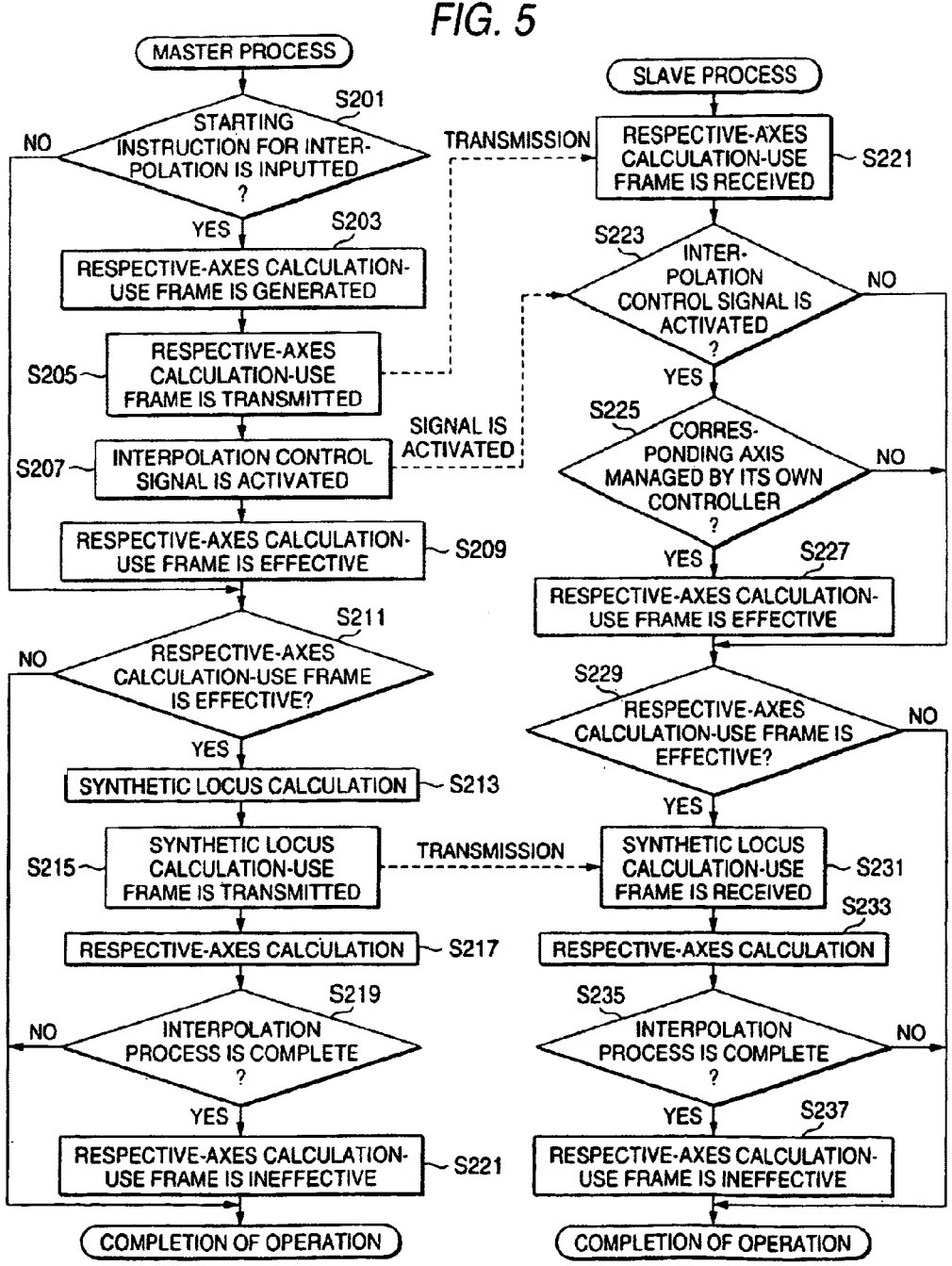
FIG. 5 is a flow chart showing a process in which a target is shifted to positioning points shown in FIG. 4 by using the servo control system of FIG. 1.
Figure 6:
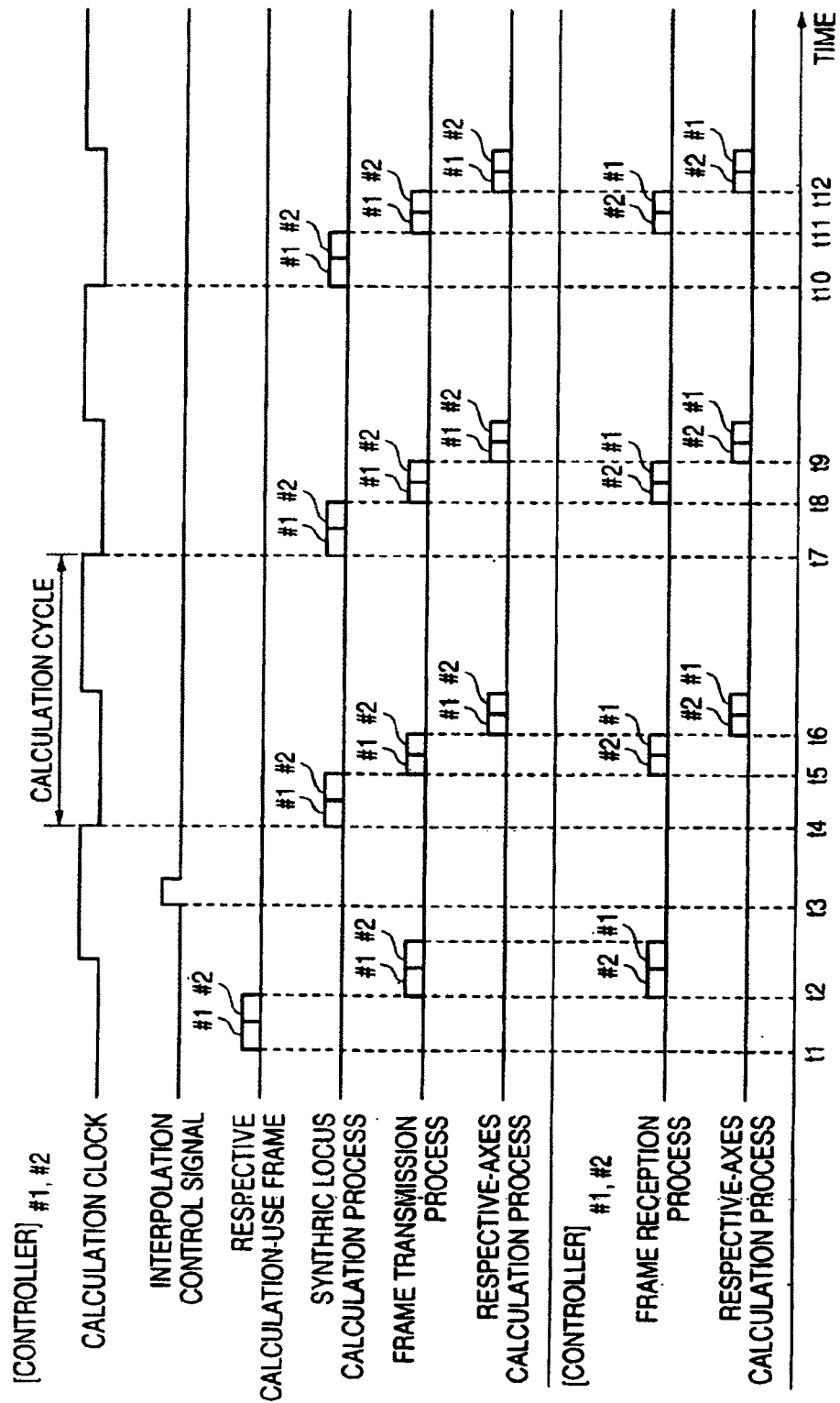
FIG. 6 is a time chart showing a process in which a target is shifted to positioning points, P0, P1, P2, P11, P12 shown in FIG. 4, by using the servo control system of FIG. 1.

Referring to FIGS. 1 to 6, the following description will discuss an operation for driving a tire molding machine using the servo-control system mentioned above. FIG. 5 is a flow chart that shows the operation of the servo control system shown in FIG. 1, and FIG. 6 is a time chart thereof.

In the tire molding apparatus 20, the drum 1 and belt conveyors B4, B5, B6 are synchronously operated each other, and in addition to this synchronous operation, the belt conveyors B10 and B11, and the belt conveyors B8 and B9 are also synchronously operated respectively. Here, an explanation will be given of a simplified case in which the servo-motors M1, M6 serving as the first and second motors and the servo-motors M4, M5 serving as the third and fourth motors are synchronously controlled between the respective controllers #1 and #2. In the case when the servo-motors M1, M6 for driving the drum 21 and the belt conveyor B6, as well as the servo-motors M4, M5 for driving the belt conveyors B4, B5, are synchronously controlled between the respective controllers #1 and #2, the first respective axes (corresponding to the X axis) of the servo-motors M1, M5 are respectively rotated with predetermined amounts, while the second respective axes (corresponding to the Y axis) of the servo-motors M6, M4 are respectively rotated with predetermined amounts; therefore, as shown in FIG. 4, the synchronous control of this type may be regarded as interpolation control.

Therefore, an explanation will be given on the assumption that, as shown in FIG. 4, the servo-motors M1, M4, M5, M6 are controlled to shift positioning points from P0 to P2 through P1, and from P0 to P12 through P11 on the biaxial plane of the X and Y axes.

Referring to FIGS. 1 to 6, the operation of the servo-control system mentioned above will be explained below. Here, calculation clocks are inputted to the bus-control-use I/Fs 31 to 33 by the clock synchronous circuits 45 to 47.

When, at time t1, a starting instruction for interpolation is inputted to each of controllers #1, #2 from an external device (not shown) (step 201), the CPUs 41, 42 of controllers #1, #2 generate respective-axes calculation-use frames 200 for calculating the respective-axes instructions for points P1, P11 based upon stored information from the control instruction units 51a, 52a (respective-axes instruction generating means, step S203). At time t2, the CPU 41(42) transmits the respective-axes calculation-use frame 200 to the bus-control-use I/F 31(32)→the bus 30→the bus-control-use I/F 32(31) (the second transmission means, step S205), and the CPU 42(41) of controllers #2, #1 receives the respective-axes calculation-use frame 200 through the bus-control-use I/F 32 (31) as a slave process (the second receiving means), and stores this in the respective-axes calculation unit 52c (51c) of the memory 52(51) (step S221).

At time t3, the CPU 41(42) of controllers #1, #2 activates an interpolation control signal serving as an interpolation instruction so that an interrupt signal is generated from the interrupt control circuit 35(36) to transmit the interrupt signal to the bus-control-use I/F31(32)→bus30→bus-control-use I/F 32(31) (step S207). The CPU 42(41) of controller #2 (#1) receives the interrupt signal through the bus-control-use I/F 32(31) as a slave process (step 223), and determines whether or not the corresponding axis is managed by its own controller #1, #2 through the interpolation target axis 207 of the respective-axes calculation-use frame 200 (step S225). When the axis is managed by its own controller #1, #2, a flag for making the respective-axes calculation-use frame 200 of the respective-axes calculation unit 51c(51c) of the memory 51(52) effective is set to 1 (step S209, S227), it is determined whether or not the respective-axes calculation-use frame 200 is effective (step S211, S229).

Here, since this is effective, at time t4, the CPU41(42) of controller #1(#2) functions as the first calculation means in synchronism with the calculation clock (clock signal) of the clock synchronous circuit 45, that is, it obtains a shift distance Lt1 (Lt11) of a synthetic locus as a length on the interpolation line between points P0–P1 (P0–P11) at the current time, and in accordance with the controlling state of the interpolation, for example, by the fact that the target has reached a predetermined range in the previous positioning instruction position, the in-position instruction 105a, etc. are set, and the synthetic locus-use frame 100 containing a synthetic locus calculated value is generated (first step, step S213).

At time t5, the CPU 41(42) of controller #1(#2) transmits this to bus-control-use I/F 31(32)→bus 30→bus-control-use I/F 32(31) (first transmission means, step S215), and the CPU 42(41) of controller #2 (#1) receives the synthetic locus-use frame 100 through the bus control use I/F32 (31) and executes the second step, and reads out the synthetic locus use frame 100 from the bus control use I/F 32, and stores this in the synthetic locus calculation unit 52b (51b) in the memory 52 (51) (step S231).

At time t6, the CPU41, (42) of controllers #1, #2 functions as a second calculation means, that is, calculates to determine the coordinates of X, Y axes managed by controllers #1, #2, by using the shift distance Lt1 (Lt11) of the synthetic locus between point P0–P1(P0–P11) and the respective-axes calculation-use instruction stored in the respective-axes calculation unit 52b (52b) of the memory 52(51) (the third step, step S217, S233). Controllers #1, #2 repeatedly execute the above-mentioned steps S201 to S237 until the completion of the interpolation control, thereby completing the interpolation process (step S219, S235), and a flag which nullifies the respective-axes calculation-use frame 200 of the respective axes calculation unit 51c (51c) of the memory 51 (52) is set to 0 (step S221, S237), thereby completing the operation. The respective-axes calculation-use frame 200 is generated by controllers #1, #2 for each point, and the respective-axes calculation-use frame 200 of points P2, P12 are back-ground processed, calculated before the start of control of points P2, P12, and transmitted to controllers #1, #2.

Moreover, at the time of deceleration and stop, the in-position signal 105a serving as the reaching instruction for executing the in-position process is set in the instruction type 105 so that, during the time from the start of deceleration and stop to the positioning to each point, the composite locus-use frame 100 is transmitted to controller #2, and the respective controllers #1, #2 are allowed to execute the process at the time of deceleration and stop in addition to the respective-axes calculations.

In a servo-control system 25 having servo-motors M1, M6 and servo-motors M4, M5 that are interpolation targets between these different controllers #1, #2, the synthetic locus calculation Lt1 for interpolation controlling so as to set point P0→P1 in controller #1 and the synthetic locus calculation Lt11 for interpolation controlling so as to set point P0→P11 in controller #2 are simultaneously executed, and the synthetic locus calculation value Lt1 of controller #1 is transmitted to controller #2 while the synthetic locus calculation value Lt11 is transmitted to controller #1.

Thus, controllers #1, #2 are able to carry out respective axes calculations based upon synthetic locus calculation values Lt1, Lt11, so that it becomes possible to shorten the processing time of interpolation control as the servo-control system 25.

In other words, in the case when the same interpolation control calculation is carried out by the respective controllers #1, #2 as in the conventional case, the interpolation controlling time is set to 15 $\mu sec \times 2 + 2.5$ $\mu sec = 32.5$ $\mu sec$, supposing that the execution time of the composite locus calculation is 15 $\mu sec$ and the execution time of the respective-axes calculation is 2.5 $\mu sec$, while the interpolation controlling time of the servo-control system 25 of the present invention is 15 $\mu sec + 2.5$ $\mu sec = 17.5$ $\mu sec$. The ratio k of the interpolation controlling times is indicated as follows:

$$K = 17.5/32.5 = 0.54$$

Therefore, in the servo-control system 25 of the present embodiment, the interpolation controlling time is reduced to approximately half the conventional interpolation controlling time.

Preferred Embodiment 2

Figure 7:
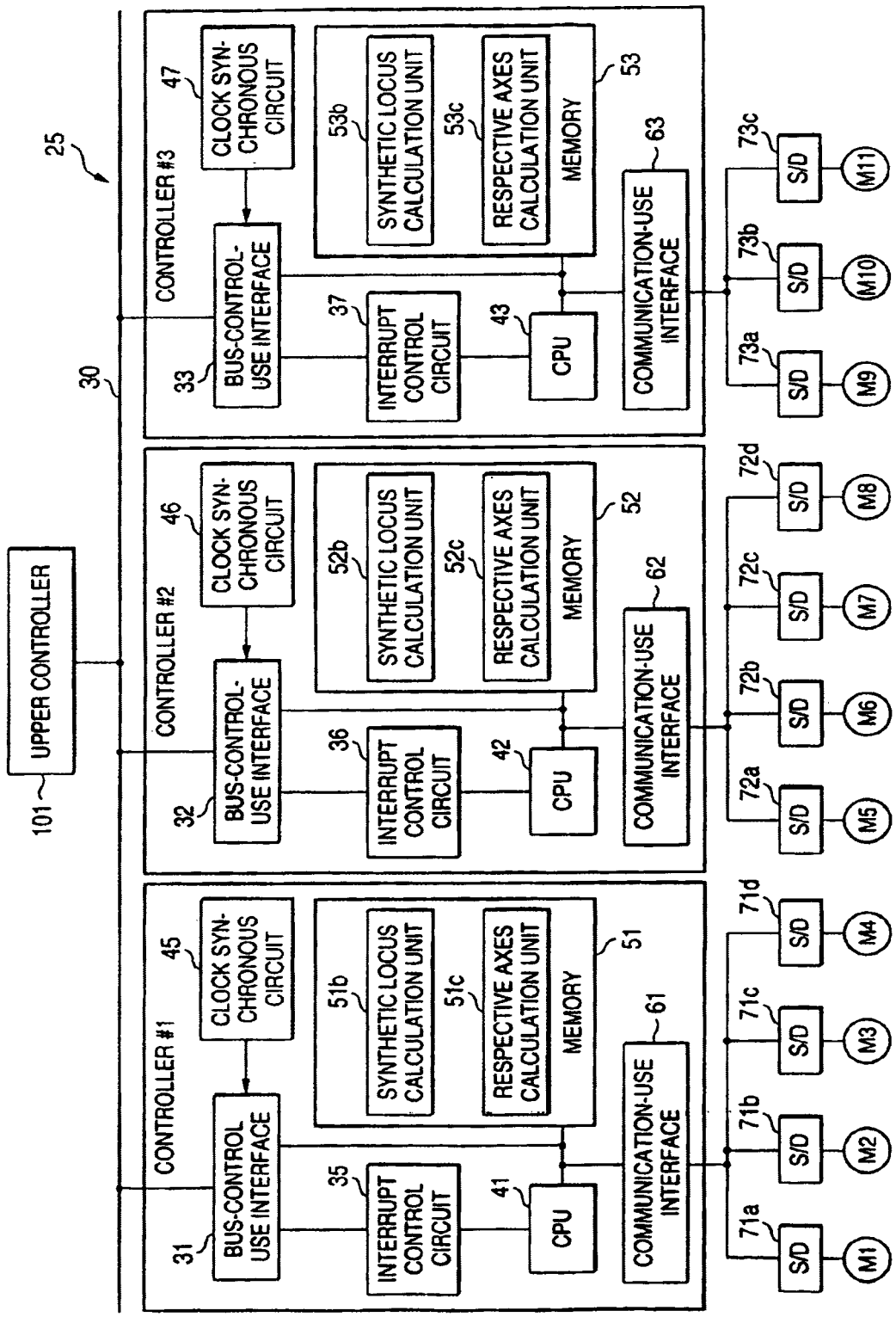
FIG. 7 is a block diagram showing the entire constitution of a servo control system according to another embodiment of this invention.
Figure 8:
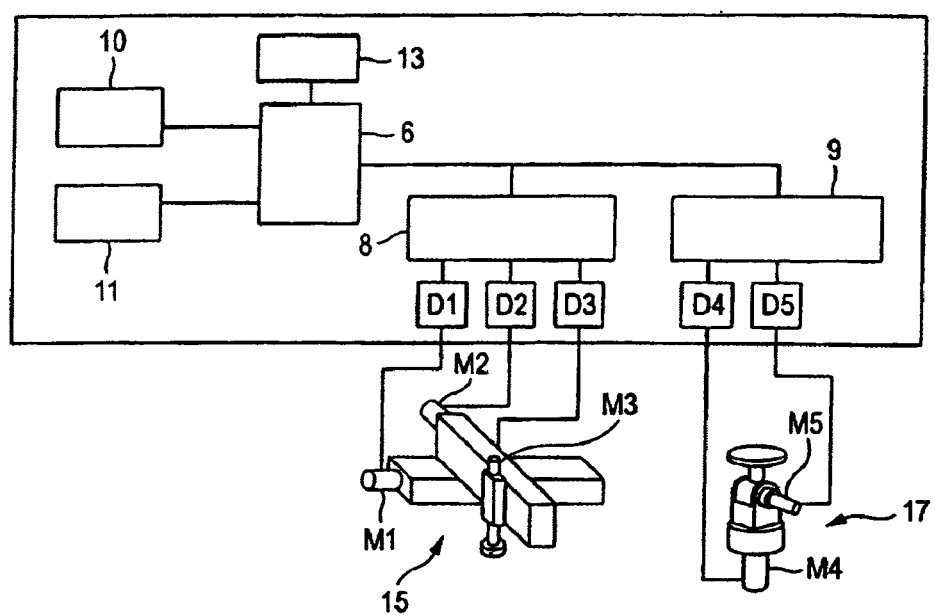
FIG. 8 is a schematic diagram showing the entire constitution of the conventional servo control system.
Figure 9:
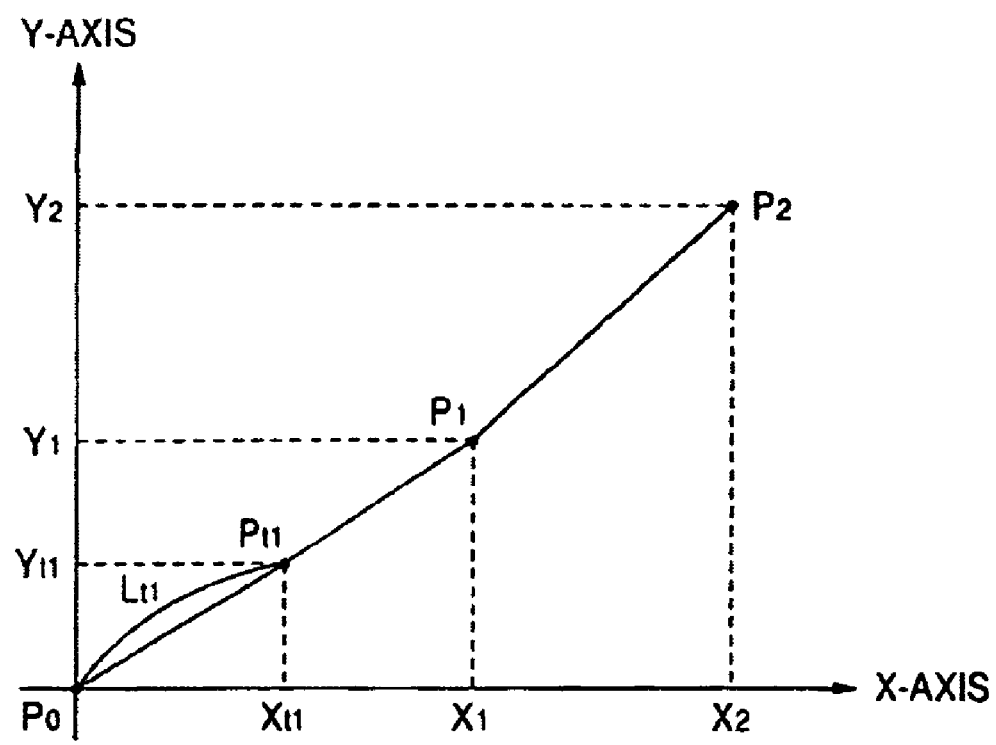
FIG. 9 is a curve showing the positioning points P0, P1, and P2.

Referring to FIG. 7, the following description will discuss another preferred embodiment of the present invention. As shown in FIG. 7, an upper controller 101 is installed in the servo-control system 25, and the upper controller 101 may have functions corresponding to control instruction units 51a to 53a in memories 51 to 53 installed in the respective controllers #1 to #3 of FIG. 2, functions for transmitting interpolation instructions to controllers #1 to #3, and functions of the respective-axes instruction generating means for generating the respective axes instructions by using interpolation instructions and for transmitting these instructions to controllers #1, #2.

In accordance with such a servo-control system 25, the processes carried out in step S203 and S205 in FIG. 5 can be executed by the upper controller 101 in a substituting manner.

INDUSTRIAL APPLICABILITY

As described above, the servo-control system and its controlling method of the present invention are suitably applied to, for example, a tire molding apparatus.

What is claimed is:
1. A servo-control system, comprising:
a first controller which controls a first and third shafts;
a second controller which controls a second and fourth shafts; wherein
said first controller includes a first storing means in which information used for calculating the length on a first interpolation line is written, a first calculation means for reading the information from said first storing means to calculate the length on said first interpolation line, a transmitting means, and a receiving means, said second controller includes a second storing means in which information used for calculating the length on a second interpolation line is written, a second calculation means for reading the information from said second storing means to calculate the length on said second interpolation line, a transmitting means, and a receiving means, and said first and second controllers transmit or receive mutually the lengths on said first interpolation line and second interpolation line through said transmitting means or receiving means, whereby calculating the positions of said first and second axes based upon the length on the first interpolation line, and calculating the positions of said third and fourth axes based upon the length on the second interpolation line.

2. A servo-control system according to claim 1, wherein the calculation of the length on the first interpolation line by said first calculation means is simultaneously executed with the calculation of the length on the second interpolation line by said second calculation means.

3. A servo-control system according to claim 1, wherein said first and second controllers further comprise a fourth storing means respectively, the fourth storing means in said first controller stores information needed for interpolation instruction for said first and second axes, which includes a current position, a target position, a maximum speed value, an acceleration time, and a deceleration time, the fourth storing means in said second controller stores information needed for interpolation instruction to said third and fourth axes, which includes a current position, a target position, a maximum speed value, an acceleration time, and a deceleration time, the first and second controllers generate respectively respective-axis calculation frame every target position based upon the information from said fourth storing means to transmit or receive mutually the respective axis calculation frame before said target position control starts.

4. A servo-control system according to claim 1, wherein said first and second controllers transmit or receive mutually an in-position instruction and an instruction type, along with the length on the first or second interpolation line, wherein the in-position instruction serves as a reaching instruction that is generated by reaching a predetermined range in the previous positioning instruction position and wherein the instruction type shows a controlled state including a control completion instruction.

5. A servo-control system according to claim 1, wherein said first and second controllers further comprise an upper controller, the upper controller containing information needed for interpolation instruction to the first and second axes, including a current position, a target position, a maximum speed value, an acceleration time, and deceleration time; and information needed for interpolation instruction to the third and fourth axes, including a current position, a target position, a maximum speed value, an acceleration time, and deceleration time; the respective-axis calculation frame being generated based upon said information to transmit to said first and second controllers.

6. A control method of a servo-control system using a first controller which controls a first and third shafts and a second controller which controls a second and fourth shafts, and mutually controlling between said first and second controllers, comprising the steps of:

executing simultaneously a synthetic locus calculation needed for respective axes calculation for said first and second axes in said first controller and a synthetic locus calculation needed for respective axes calculation for said third and fourth axes in said second controller, transmitting the result of said synthetic locus calculation in the first controller to the second controller, transmitting the result of said synthetic locus calculation in the second controller to the first controller, and executing respective axes calculation for said first to fourth axes based upon the result of said synthetic locus calculations.

* * * * *